US005722448A

United States Patent [19]

Dourado

[11] Patent Number: 5,722,448

[45] Date of Patent: Mar. 3, 1998

[54] GAS LINE AUTOMATIC CUT OFF VALVE

[76] Inventor: Mizael F. Dourado, 26 Searing Ave. #1, Harrison, N.J. 07029

[21] Appl. No.: 689,486

[22] Filed: Aug. 8, 1996

[51] Int. Cl.$^{6}$ ........ F16K 17/36

[52] U.S. Cl. ........ 137/78.4; 137/78.5

[58] Field of Search ........ 137/78.4, 78.5

[56] References Cited

U.S. PATENT DOCUMENTS

| | | | |
|---|---|---|---|
| 2,508,588 | 5/1950 | Waltman | 137/78.4 |
| 4,263,928 | 4/1981 | Kobayashi et al. | 137/78.4 |
| 4,787,410 | 11/1988 | Fujieda et al. | 137/78.4 |
| 4,974,624 | 12/1990 | Gotanda | 137/78.4 |
| 5,419,358 | 5/1995 | Sun | 137/78.4 |

FOREIGN PATENT DOCUMENTS

| | | | |
|---|---|---|---|
| 0163786 | 10/1982 | Japan | 137/78.4 |

*Primary Examiner*—A. Michael Chambers

[57] ABSTRACT

A gas line automatic cut off valve including a gas valve housing adapted to be conveniently coupled between a standard gas line outlet and a standard gas powered appliance; a gas valve situated within the gas valve housing, the gas valve having a first orientation for precluding gas from flowing between the standard gas line outlet and the standard gas powered appliance upon the lack of receipt of an activation signal and further a second orientation for allowing gas to flow between the standard gas line outlet and the standard gas powered appliance upon the receipt of an activation signal; and a gas detector situated above the standard gas powered appliance and electrically connected to the valve, the gas detector adapted to continuously transmit an activation signal upon the detection of gas and further adapted to cease the transmission of the activation signal only upon the depression of a reset button situated on the bottom face thereof.

3 Claims, 3 Drawing Sheets

GAS LINE AUTOMATIC CUT OFF VALVE

BACKGROUND OF THE INVENTION

1. Field of the Invention

The present invention relates to a gas line automatic cut off valve and more particularly pertains to automatically precluding gas from being supplied to an appliance upon the detection of smoke or gas with an easily retrofitted valve which requires minimal space.

2. Description of the Prior Art

The use of gas valves is known in the prior art. More specifically, gas valves heretofore devised and utilized for the purpose of cutting off a gas supply to an appliance are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,098,284 to Yamada; U.S. Pat. No. 4,841,287 to Flig et al.; U.S. Pat. Des. No. 297,317 to Taylor; U.S. Pat. No. 4,683,463 to Kimura; U.S. Pat. No. 4,819,551 to Vole; and U.S. Pat. No. 4,458,242 to Kusanagi et al. are provided as being of general interest.

In this respect, the gas line automatic cut off valve according to the present invention substantially departs from the conventional concepts and designs of the prior art, and in so doing provides an apparatus primarily developed for the purpose of automatically precluding gas from being supplied to an appliance upon the detection of smoke or gas with an easily retrofitted valve which requires minimal space.

Therefore, it can be appreciated that there exists a continuing need for a new and improved gas line automatic cut off valve which can be used for automatically precluding gas from being supplied to an appliance upon the detection of smoke or gas with an easily retrofitted valve which requires minimal space. In this regard, the present invention substantially fulfills this need.

SUMMARY OF THE INVENTION

In view of the foregoing disadvantages inherent in the known types of gas valves now present in the prior art, the present invention provides an improved gas line automatic cut off valve. As such, the general purpose of the present invention, which will be described subsequently in greater detail, is to provide a new and improved gas line automatic cut off valve which has all the advantages of the prior art and none of the disadvantages.

To attain this, the present invention essentially includes a gas valve housing with a rectangular configuration having a top face, a bottom face, a front face, a rear face, and a pair of side faces formed therebetween defining an interior space, the gas valve housing including an entry conduit with a horizontal orientation having a first end situated on the rear face of the housing adjacent the top face thereof with a threaded protrusion extending outwardly from the rear face for allowing coupling with a standard gas line outlet and a second end situated within the interior space adjacent the front face of the housing; an egress conduit having a first end situated on the front face of the housing adjacent the bottom face thereof with a threaded protrusion extending outwardly from the front face for allowing coupling with a standard gas powered appliance and a second end situated within the interior space adjacent the front face of the housing; a valve conduit with a vertical orientation formed in communication with both the second end of the entry conduit and the second end of the egress conduit; and a valve encasing situated with the interior space of the housing including a rectangular slot with a horizontal orientation formed through the valve conduit midway between the entry conduit and the egress conduit with the rectangular slot having a first closed end adjacent the front face and a second open end defined by a periphery of the valve conduit, a flange encasing with a cylindrical configuration having first circular face formed adjacent the valve conduit in communication with the rectangular slot and second open circular face situated opposite the first circular face, and a solenoid encasing with a cylindrical configuration having a first open circular face formed in communication with the second circular face of the flange encasing and a second closed circular face situated opposite the first circular face; a valve including a horizontally orientated member slidably situated within the rectangular slot of the valve encasing, the horizontally orientated member having an aperture formed therein with a first orientation with the aperture of the horizontally orientated member inserted within the slot for positioning the aperture in alignment with the valve conduit thus allowing gas to flow between the entry conduit and the egress conduit and a second orientation for situating the aperture of the horizontally orientated member within the flange encasing for precluding gas from flowing between the entry conduit and egress conduit, a circular flange integrally formed perpendicular with respect to the horizontally orientated member and adapted to slide within the flange encasing thus allowing the positioning of the horizontally orientated member in the first orientation and second orientation thereof while precluding gas from escaping the rectangular slot and flange encasing, and a solenoid situated within the solenoid encasing having an associated transducer coupled to the flange having a first unbiased orientation upon the lack of receipt of an activation signal with the transducer forcing the horizontally orientated member in the first orientation thereof and having a second biased orientation only upon the receipt of an activation signal with the transducer forcing the horizontally orientated member in the second orientation thereof; and, a gas and smoke detector with a top face, a bottom face, and a periphery formed therebetween, the gas and smoke detector situated above the standard gas powered appliance and electrically connected to the solenoid of the valve, the gas and smoke detector adapted to continuously transmit an activation signal upon the detection of smoke and further transmit an activation signal upon the detection of gas, the gas and smoke detector further adapted to cease the transmission of the activation signal only upon the depression of a reset button situated on the bottom face thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved gas line automatic cut off valve which has all the advantages of the prior art gas valves and none of the disadvantages.

It is another object of the present invention to provide a new and improved gas line automatic cut off valve which may be easily and efficiently manufactured and marketed.

It is a further object of the present invention to provide a new and improved gas line automatic cut off valve which is of a durable and reliable construction.

An even further object of the present invention is to provide a new and improved gas line automatic cut off valve which is susceptible of a low cost of manufacture with regard to both materials and labor, and which accordingly is then susceptible of low prices of sale to the consuming public, thereby making such gas line automatic cut off valve economically available to the buying public.

Still yet another object of the present invention is to provide a new and improved gas line automatic cut off valve which provides in the apparatuses and methods of the prior art some of the advantages thereof, while simultaneously overcoming some of the disadvantages normally associated therewith.

Still another object of the present invention is to automatically preclude gas from being supplied to an appliance upon the detection of smoke or gas with an easily retrofitted valve which requires minimal space.

Lastly, it is an object of the present invention to provide a new and improved gas line automatic cut off valve including a gas valve housing adapted to be conveniently coupled between a standard gas line outlet and a standard gas powered appliance; a gas valve situated within the gas valve housing, the gas valve having a first orientation for precluding gas from flowing between the standard gas line outlet and the standard gas powered appliance upon the lack of receipt of an activation signal and further a second orientation for allowing gas to flow between the standard gas line outlet and the standard gas powered appliance upon the receipt of an activation signal; and a gas detector situated above the standard gas powered appliance and electrically connected to the valve, the gas detector adapted to continuously transmit an activation signal upon the detection of gas and further adapted to cease the transmission of the activation signal only upon the depression of a reset button situated on the bottom face thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 2:
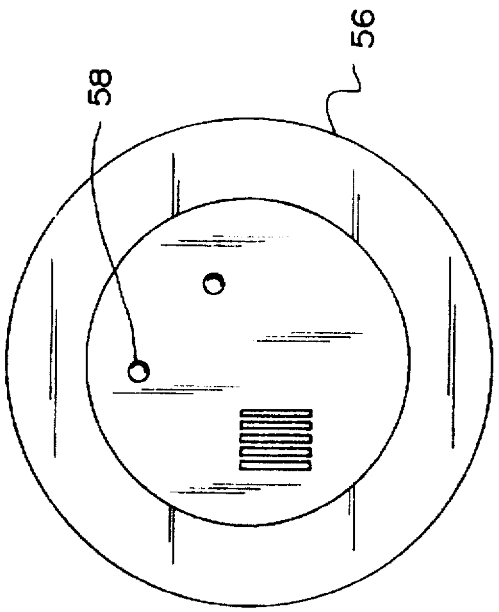
FIG. 2 is a bottom plan view of the gas and smoke detector of the present invention.
Figure 1:
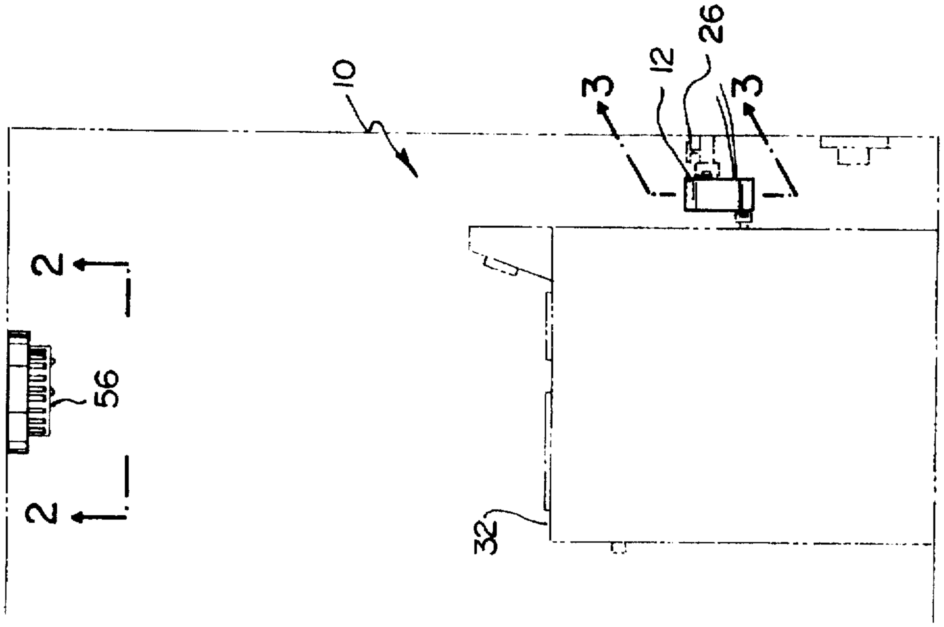
FIG. 1 is an illustration of the preferred embodiment of the gas line automatic cut off valve constructed in accordance with the principles of the present invention.

With reference now to the drawings, and in particular to FIG. 1 thereof, a new and improved gas line automatic cut off valve embodying the principles and concepts of the present invention and generally designated by the reference numeral 10 will be described.

The present invention, the new and improved gas line automatic cut off valve, is comprised of a plurality of components. Such components in their broadest context include a gas valve housing, gas valve, and gas and smoke detector. Such components are individually configured and correlated with respect to each other so as to attain the desired objective.

Figure 3:
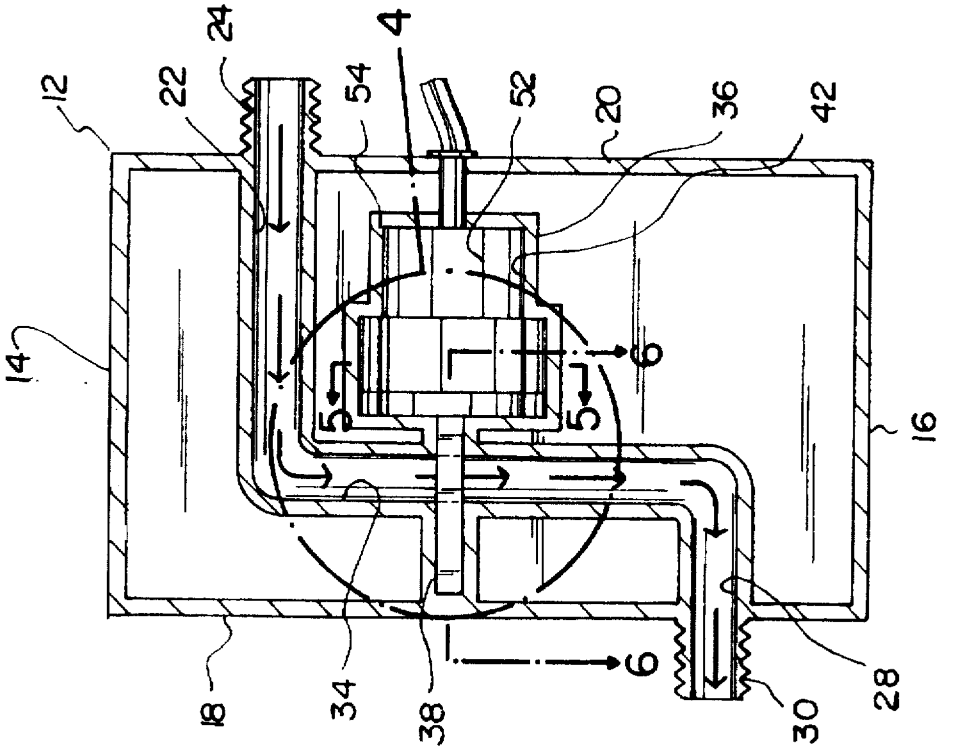
FIG. 3 is a cross-sectional view of the gas valve housing taken along line 3—3 shown in FIG. 1.
Figure 6:
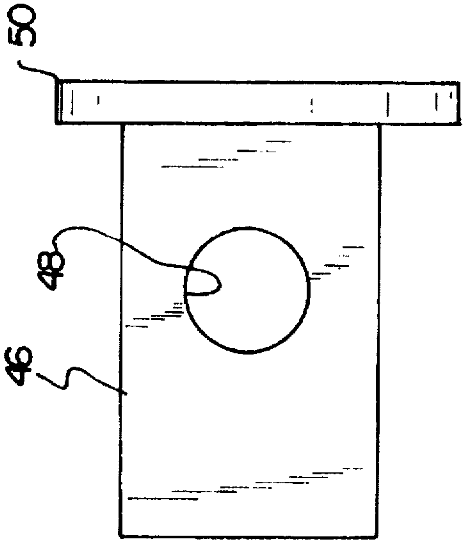
FIG. 6 is an elevational view of the horizontally situated member depicted in FIGS. 3 and 4.

More specifically, it will be noted that the system 10 of the present invention includes a gas valve housing 12 with a rectangular configuration. Preferably, the gas valve housing is constructed from a durable metallic material. The gas valve has a top face 14, a bottom face 16, a front face 18, a rear face 20, and a pair of side faces formed therebetween defining an interior space. The gas valve housing further includes an entry conduit 22 with a horizontal orientation having a first end situated on the rear face of the housing adjacent the top face thereof. The first end of the entry conduit has a threaded protrusion 24 extending outwardly from the rear face for allowing coupling with a standard gas line outlet 26. A second end of the entry conduit is situated within the interior space adjacent the front face of the housing. An egress conduit 28 is included with a first end situated on the front face of the housing adjacent the bottom face thereof. The first end of the egress conduit has a threaded protrusion 30 extending outwardly from the front face for allowing convenient coupling with a standard gas powered appliance 32. The egress conduit further includes a second end situated within the interior space adjacent the front face of the housing. As best shown in FIG. 3, a valve conduit 34 is included with a vertical orientation formed in communication with both the second end of the entry conduit and the second end of the egress conduit. It should be noted that the housing has a height which is at least twice the width for requiring minimal space after installation. This feature in combination with the position of the entry conduit, egress conduit, and valve conduit provide a unique housing for affording convenient coupling between the appliance and gas line outlet.

Figure 5:
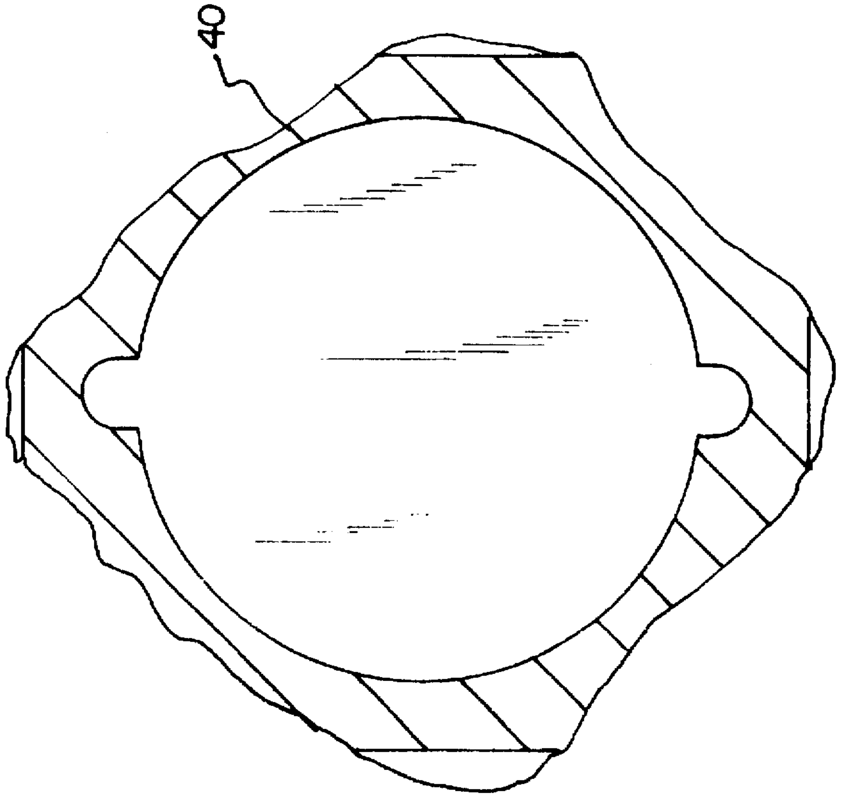
FIG. 5 is a cross-sectional view of the flange encasing taken along line 5—5 shown in FIG. 3.

Further provided is a valve encasing 36 situated with the interior space of the housing. The valve encasing includes a rectangular slot 38 with a horizontal orientation formed through the valve conduit midway between the entry conduit and the egress conduit. The rectangular slot has a first closed end adjacent the front face of the valve housing and a second open end defined by a periphery of the valve conduit. A flange encasing 40 is included with a cylindrical configuration having first circular face formed adjacent the valve conduit in communication with the rectangular slot. The flange encasing further has a second open circular face situated opposite the first circular face. Ideally, as shown in FIG. 5, the flange encasing has a pair of grooves formed on a periphery thereof between the first and second circular face. A solenoid encasing 42 with a cylindrical configuration has a first open circular face formed in communication with the second circular face of the flange encasing and a second closed circular face situated opposite the first circular face. Ideally, the solenoid encasing has a diameter which is less than that of the flange encasing.

Figure 4:
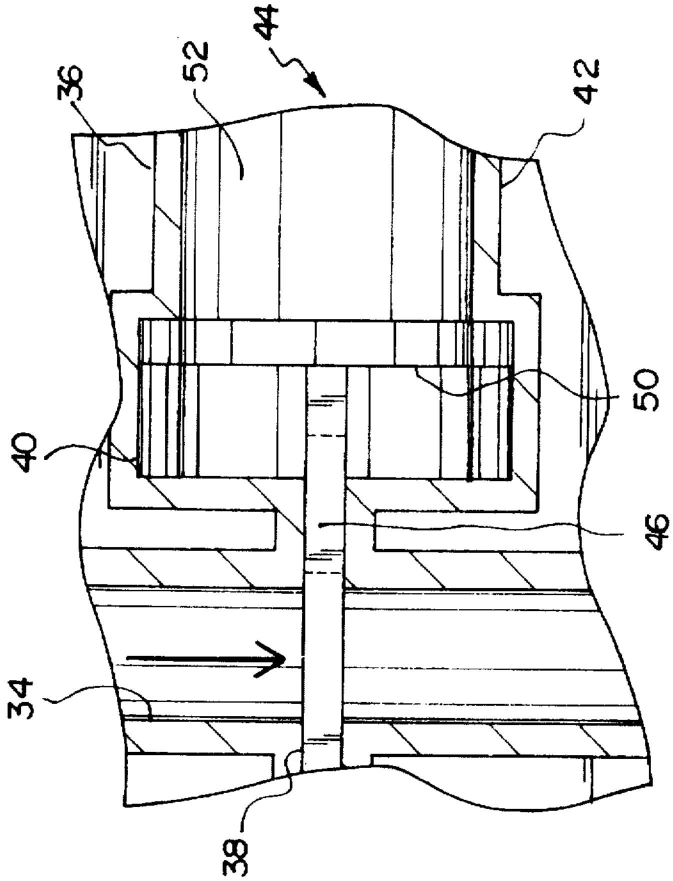
FIG. 4 is an exploded view of the solenoid of the gas valve residing in the second orientation thereof.

A valve 44 is situated within the valve housing. The valve includes a horizontally orientated member 46 slidably situated within the rectangular slot of the valve encasing. The horizontally orientated member has an aperture 48 formed therein with a first orientation wherein the aperture of the horizontally orientated member is fully inserted within the slot. Such orientation is for positioning the aperture in alignment with the valve conduit thus allowing gas to flow between the entry conduit and the egress conduit. As shown in FIG. 4, the horizontally orientated member further has a second orientation for situating the aperture of the horizontally orientated member within the flange encasing. As such, the horizontal member is situated within the valve conduit thus precluding gas from flowing between the entry conduit and egress conduit. A circular flange 50 is integrally formed perpendicular with respect to the horizontally orientated member. In use, the circular flange is adapted to slide within the flange encasing thus allowing the positioning of the horizontally orientated member in the first orientation and second orientation thereof while precluding gas from escaping the rectangular slot and flange encasing. Preferably, the circular flange further has a pair of extensions adapted to slidably insert within the grooves of the flange encasing. For facilitating operation of the valve, a solenoid 52 is situated within the solenoid encasing. The solenoid has an associated transducer 54 coupled to the flange. The transducer has a first unbiased orientation upon the lack of receipt of an activation signal. In such orientation, the transducer forces the horizontally orientated member in the first orientation thereof. The transducer of the solenoid further has a second biased orientation only upon the receipt of an activation signal with the transducer forcing the horizontally orientated member in the second orientation thereof. The solenoid is adapted to receive the activation signal via a control line coupled thereto and extending through the rear face of the housing. Preferably, a grommet is situated about the control line at the rear face to prevent the severing thereof.

Finally, a gas and smoke detector 56 is included with a top face, a bottom face, and a periphery formed therebetween. The gas and smoke detector is situated above the standard gas powered appliance and electrically connected to the solenoid of the valve via the control line. During operation, the gas and smoke detector is adapted to continuously transmit an activation signal upon the instantaneous detection of smoke. In addition, the detector transmits an activation signal upon the instantaneous detection of gas. The gas and smoke detector is further adapted to cease the transmission of the activation signal only upon the depression of a reset button 58 situated on the bottom face thereof.

Additionally, a test button may be included for transmitting an activation signal upon the depression thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A new and improved gas line automatic cut off valve comprising, in combination:

a gas valve housing with a rectangular configuration having a top face, a bottom face, a front face, a rear face, and a pair of side faces formed therebetween defining an interior space, the gas valve housing including an entry conduit with a horizontal orientation having a first end situated on the rear face of the housing adjacent the top face thereof with a threaded protrusion extending outwardly from the rear face for allowing coupling with a standard gas line outlet and a second end situated within the interior space adjacent the front face of the housing; an egress conduit having a first end situated on the front face of the housing adjacent the bottom face thereof with a threaded protrusion extending outwardly from the front face for allowing coupling with a standard gas powered appliance and a second end situated within the interior space adjacent the front face of the housing; a valve conduit with a vertical orientation formed in communication with both the second end of the entry conduit and the second end of the egress conduit; and a valve encasing situated with the interior space of the housing including a rectangular slot with a horizontal orientation formed through the valve conduit midway between the entry conduit and the egress conduit with the rectangular slot having a first closed end adjacent the front face and a second open end defined by a periphery of the valve conduit, a flange encasing with a cylindrical configuration having first circular face formed adjacent the valve conduit in communication with the rectangular slot and second open circular face situated opposite the first circular face, and a solenoid encasing with a cylindrical configuration having a first open circular face formed in communication with the second circular face of the flange encasing and a second closed circular face situated opposite the first circular face;

a valve including a horizontally orientated member slidably situated within the rectangular slot of the valve encasing, the horizontally orientated member having an aperture formed therein with a first orientation with the aperture of the horizontally orientated member inserted within the slot for positioning the aperture in alignment with the valve conduit thus allowing gas to flow between the entry conduit and the egress conduit and a second orientation for situating the aperture of the horizontally orientated member within the flange encasing for precluding gas from flowing between the entry conduit and egress conduit, a circular flange integrally formed perpendicular with respect to the horizontally orientated member and adapted to slide within the flange encasing thus allowing the positioning of the horizontally orientated member in the first orientation and second orientation thereof while precluding gas from escaping the rectangular slot and flange encasing, and a solenoid situated within the solenoid encasing having an associated transducer coupled to the flange having a first unbiased orientation upon the lack of receipt of an activation signal with the transducer forcing the horizontally orientated member in the first orientation thereof and having a second biased orientation only upon the receipt of an activation signal with the transducer forcing the horizontally orientated member in the second orientation thereof; and a gas and smoke detector with a top face, a bottom face, and a periphery formed therebetween, the gas and smoke detector situated above the standard gas powered appliance and electrically connected to the solenoid of the valve, the gas and smoke detector adapted to continuously transmit an activation signal upon the detection of smoke and further transmit an activation signal upon the detection of gas, the gas and smoke detector further adapted to cease the transmission of the activation signal only upon the depression of a reset button situated on the bottom face thereof.

2. A gas line automatic cut off valve comprising:

a gas valve housing adapted to be conveniently coupled between a standard gas line outlet and a standard gas powered appliance;

a gas valve situated within the gas valve housing, the gas valve having a first orientation for precluding gas from flowing between the standard gas line outlet and the standard gas powered appliance upon the lack of receipt of an activation signal and further a second orientation for allowing gas to flow between the standard gas line outlet and the standard gas powered appliance upon the receipt of an activation signal; and a gas detector situated above the standard gas powered appliance and electrically connected to the valve, the gas detector adapted to continuously transmit an activation signal upon the detection of gas and further adapted to cease the transmission of the activation signal only upon the depression of a reset button situated on the bottom face thereof;

wherein the gas detector is further adapted to continuously transmit an activation signal upon the detection of smoke.

3. A gas line automatic cut off valve housing having a top face, a bottom face, a front face, a rear face, and a pair of side faces formed therebetween defining an interior space, the gas valve housing including an entry conduit with a horizontal orientation having a first end situated on the rear face of the housing adjacent the top face thereof with a threaded protrusion extending outwardly from the rear face for allowing coupling with a standard gas line outlet and a second end situated within the interior space adjacent the front face of the housing; an egress conduit having a first end situated on the front face of the housing adjacent the bottom face thereof with a threaded protrusion extending outwardly from the front face for allowing coupling with a standard gas powered appliance and a second end situated within the interior space adjacent the front face of the housing; a valve conduit with a vertical orientation formed in communication with both the second end of the entry conduit and the second end of the egress conduit; and a valve encasing situated with the interior space of the housing including a rectangular slot with a horizontal orientation formed through the valve conduit midway between the entry conduit and the egress conduit with the rectangular slot having a first closed end adjacent the front face and a second open end defined by a periphery of the valve conduit, a flange encasing with a cylindrical configuration having first circular face formed adjacent the valve conduit in communication with the rectangular slot and second open circular face situated opposite the first circular face, and a solenoid encasing with a cylindrical configuration having a first open circular face formed in communication with the second circular face of the flange encasing and a second closed circular face situated opposite the first circular face.

* * * * *